April 16, 1963 H. PRIDGEON 3,085,811
MOUNTING STUDS FOR MACHINE TOOL CHUCKS, FACE
PLATES OR THE LIKE
Filed April 6, 1961

Inventor
Herbert Pridgeon
by Pierce, Scheffler & Parker
atty's

# United States Patent Office 3,085,811
Patented Apr. 16, 1963

3,085,811
MOUNTING STUDS FOR MACHINE TOOL CHUCKS, FACE PLATES OR THE LIKE
Herbert Pridgeon, Keighley, England, assignor to F. Pratt & Co. Limited, Halifax, England, a British company
Filed Apr. 6, 1961, Ser. No. 101,284
Claims priority, application Great Britain Apr. 8, 1960
7 Claims. (Cl. 279—1)

This invention relates to mounting studs for machine tool chucks, face plates, catch plates or the like (all of which are hereinafter referred to as "tool chucks"). Mounting studs are employed for registering and securing tool chucks to the flange of a machine tool spindle.

Mounting studs take a variety of forms and are usually screw-threaded at one end to be mounted on a tool chuck so that they project from the rear face thereon. This projecting end is then located in a blind or through hole in the spindle flange.

It has been realized for some time that when locating a tool chuck, particularly of the heavy duty type, the studs can damage the face of the spindle flange, and it is not always easy accurately to register the studs with their associated holes. After the studs have been registered the chuck is secured by cams associated with the studs or by lock nuts or other means.

It is the main object of this invention to provide a mounting stud which overcomes the problem of damaging the spindle flange when the stud is being located in position.

According to the present invention there is provided a mounting stud for machine tool chucks, wherein the end of the stud to be offered into register with a hole in the flange of a tool spindle is furnished with a protective device formed of a material of less hardness than that of the flange material.

In a further feature of the invention the stud end may be of reduced diameter for a predetermined distance from its end and the protective device may be in the form of a cover which is held in place either by an interference fit with the stud end or by the use of an adhesive between the reduced portion and the cover.

In a still further feature of the invention, the protective device is of plastics material which may be high-density polythene.

In order that the invention may readily be carried into effect several embodiments thereof will now be described by way of example only and with reference to the accompanying drawing in which.

Figure 1:
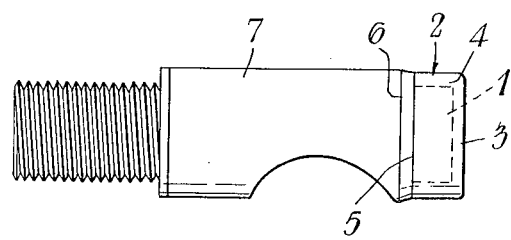
FIG. 1 is a side elevation of a mounting stud in accordance with the invention.

Referring first to FIG. 1, a mounting stud of the so-called cam lock type of known pattern has its free end 1 of reduced diameter to provide a cylindrical extremity, and on this is located a cap-like protective device 2 which, in this embodiment, is an interference fit. The base 3 and wall 4 of the cap may be of equal thickness and the external juncture of the wall with the base may be radiused or chamfered. Preferably, but not necessarily, the external diameter of the cap 2 is slightly less than the diameter of the stud which has been reduced to form the cap receiving end and the shoulder 5, against which the cap 2 abuts, is at the end of a short taper 6 from the main shank 7 of the mounting stud.

Figure 2:
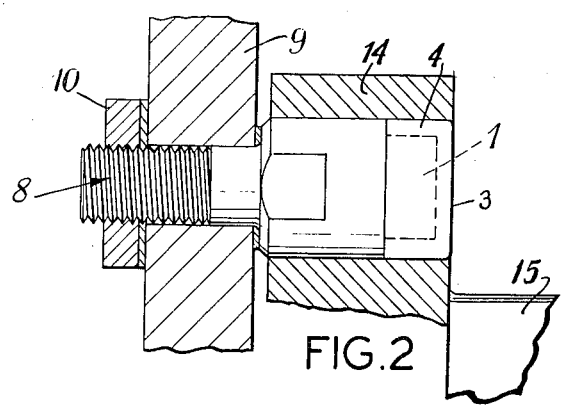
FIG. 2 is a part sectional side elevation of a further mounting stud in accordance with the invention fitted to a chuck and to the flange of a machine tool spindle.

In the furher embodiment of the invention shown in FIG. 2, the stud is provided with a projecting screw-threaded end 8 which passes through a hole in a tool chuck 9 and has a back lock nut 10. In this embodiment, the free end 1 is reduced in diameter as in FIG. 1 embodiment and the protective device is in the form of a cap 2 which again may be an interference fit. The cap, however, may be secured to the free end 1 by the use of an adhesive. As shown, the stud extends through a hole in the flange 14 of the machine tool spindle 15.

Instead of using a preformed cap, a cap may be moulded on to the reduced end of the stud or alternatively, a preformed cap may be compressed in a heated state on to a stud end which may be shaped to furnish mechanical interlocking.

Figure 3:
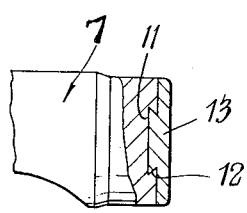
FIGS. 3 and 4 are fragmentary side elevations partly in section of still further mounting studs in accordance with the invention.

In some cases it may be found sufficient to furnish a protective disc on the extreme free end of a mounting stud, and such a disc can be secured in any convenient manner which may be simply by an adhesive. On the other hand, such a disc may be secured mechanically in addition to or instead of the use of an adhesive. For example, as shown in FIG. 3 the stud free end 1 is provided with a shallow recess 11 with an undercut edge 12 into which the protective device can be introduced. The protective device is in the form of a disc 13.

Figure 4:
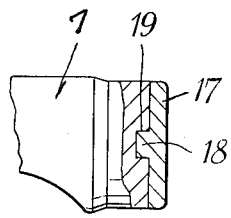

In another embodiment illustrated in FIG. 4, a disc 17 is provided with a boss 18 which enters a blind hole 19 in the end of the stud.

In each of the above mentioned embodiments it will be appreciated that the protective device, whether in the form of a cap illustrated in FIGS. 1 and 2 or a disc illustrated in FIGS. 3 and 4, will be of a material of less hardness than that of the flange material of the spindle. For this purpose a variety of materials may be used, and in particular it has been found that the cap or disc may be made of a plastics material such as high-density polythene.

What I claim is:

1. A mounting stud for locating and holding a chuck upon the flange of a machine tool spindle, said stud comprising a shank portion for reception as a sliding fit in a bore in the flange, means at one end of said shank portion for securing said stud to the chuck with said stud projecting generally perpendicularly therefrom, and affixed to the free end of said stud a resilient cushioning member of similar diameter to said shank portion.

2. A mounting stud as claimed in claim 1, wherein said resilient cushioning member is made of a plastic material.

3. A mounting stud as claimed in claim 2, wherein said resilient cushioning member is made of high-density polythene.

4. A mounting stud as claimed in claim 1, wherein the said free end and said cushioning member are formed with a recess and a projection, respectively, of fitting cross section.

5. A mounting stud as claimed in claim 4, wherein the wall of the recess is undercut.

6. A mounting stud as claimed in claim 1, wherein a portion of said shank portion at the free end thereof is of reduced cross section and wherein the cushioning member is a cap fitting said portion of reduced cross section as an interference fit.

7. A mounting stud as claimed in claim 1, wherein said cushioning member is a disc one face of which is affixed to the free end of said shank portion with the aid of an adhesive.

References Cited in the file of this patent
UNITED STATES PATENTS 2,805,864    Parker _____ Sept. 10, 1957
2,984,494    Alston _____ May 16, 1961